INVENTOR.
ROBERT C. MONTROSS

INVENTOR.
ROBERT C. MONTROSS
BY

United States Patent Office 2,971,142
Patented Feb. 7, 1961

2,971,142

TRANSISTORIZED CIRCUIT FOR POSITIONING SLAVE POTENTIOMETERS

Robert C. Montross, Thiensville, Wis., assignor to Square D Company, Detroit, Mich., a corporation of Michigan Filed May 9, 1958, Ser. No. 734,339

7 Claims. (Cl. 318—29)

This invention relates to electrical controls and is more particularly directed to a transistorized circuit for accomplishing a control function.

It is an object of the present invention to correlate the positions of at least two potentiometers through a transistorized circuit which is responsive to the position of at least one of the potentiometers.

A further object of the present invention is to vary the position of at least one slave potentiometer through a transistorized circuit which is responsive to the position of a master potentiometer.

Another object of the present invention is to control the positioning of at least one slave potentiometer with a transistorized circuit means which is responsive to the position of a master potentiometer.

A still further object is to couple regulating and regulated elements through a transistorized circuit whereby a repositioning of the regulating element will cause a corresponding repositioning of the regulated element.

It is another object of the present invention to control the positioning of a pair of slave potentiometers by a transistorized circuit which has an output regulated by the voltage differences between the master and one of the slave potentiometers.

A still further object of the present invention is to couple the sliders of a slave and master potentiometer through transistor means whereby a change of position of the slider of the master will vary the energization of the transistor means to cause a corresponding change in the position of the slider on the slave potentiometer.

Further objects and features of the invention will be readily apparent to those skilled in the art from the specification and appended drawing illustrating certain preferred embodiments in which.

Figure 1:
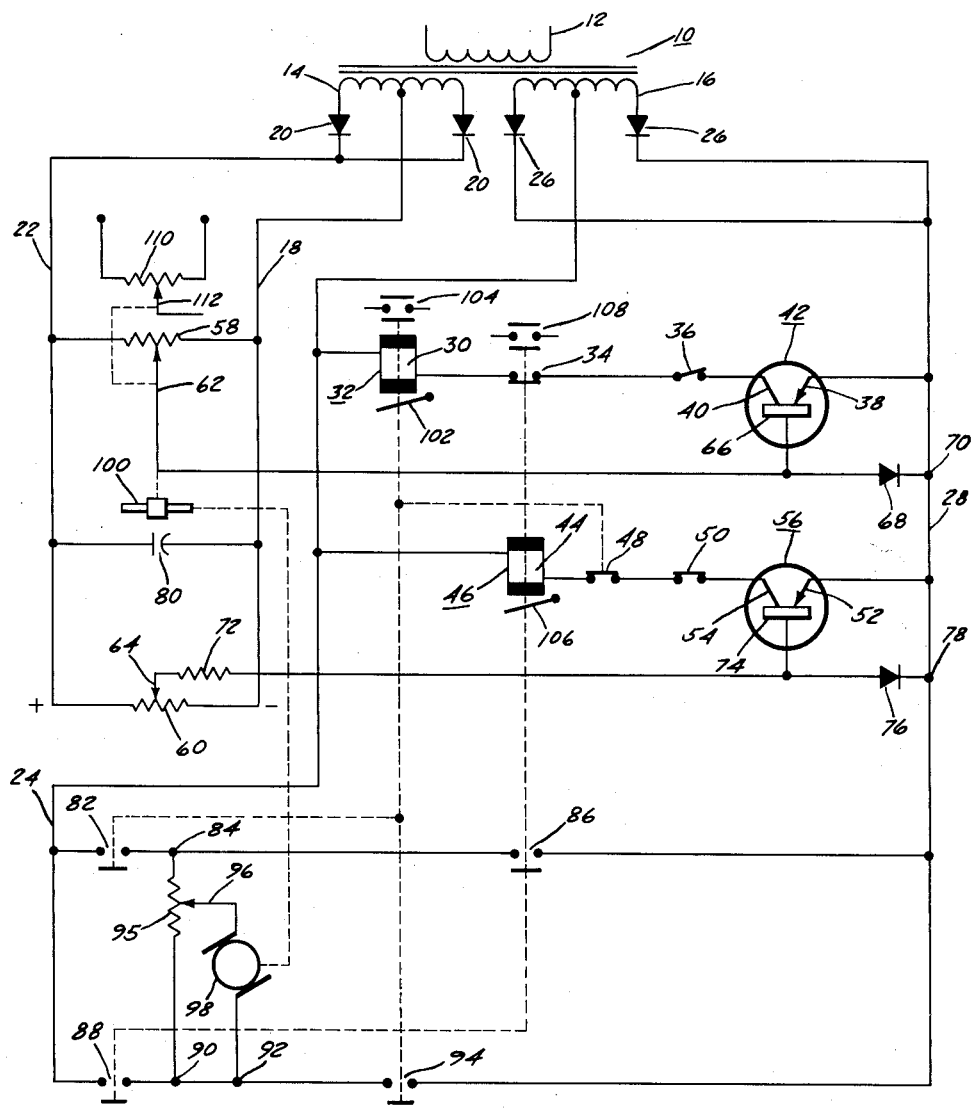
Fig. 1 is a diagrammatic circuit diagram of the potentiometer adjusting circuit according to the present invention.

In Fig. 1 of the drawings, the transformer 10 has a primary winding 12 connected to a suitable source of alternating current, not shown. The transformer 10 also has a pair of center tapped secondary windings 14 and 16. The winding 14 has its center tap connected to supply lead 18 and has its other terminals connected through suitable rectifiers 20 to supply lead 22 with direct current. The secondary winding 16 has its center tap connected to supply lead 24 and has its other two terminals connected through rectifiers 26 to supply lead 28 with direct current.

Connected between leads 24 and 28 is a series circuit comprising; an actuating coil 30 of a relay 32, a pair of normally closed switch contacts 34, a normally closed switch 36 and an emitter 38 and a collector 40 of a transistor 42. Also connected between leads 24 and 28 in a series circuit are an actuating coil 44 of a relay 46, a pair of normally closed contacts 48, a pair of normally closed contacts 50 and an emitter 52 and a collector 54 of a transistor 56.

Connected across the leads 18 and 22 in parallel are potentiometer resistors 58 and 60 which respectively have movable sliders 62 and 64. The slider 62 is connected to the base 66 of the transistor 42 which in turn is connected through a rectifier diode 68 to lead 28 at junction 70. The slider 64 is connected through a current limiting resistance 72 to the base 74 of the transistor 56 which in turn is connected through a rectifying diode 76 to lead 28 at junction 78. Also connected between leads 22 and 18 is a capacitor 80 which smoothens out the A.C. ripple between leads 18 and 22 from the transformer secondary 14.

Connected across leads 24 and 28 in series is a normally open switch 82, a junction 84 and a normally open switch 86. Also connected between leads 24 and 28 is a series circuit comprising; a normally open switch 88, a junction 90, a junction 92 and a normally open switch 94. Connected between junctions 84 and 90 is a potentiometer resistance 95 having a slider 96. A motor 98 has its terminals respectively connected to the slider 96 and junction 92. This motor is suitably mechanically connected by conventional means to a suitable mechanical element 100 which will cause the movement of the slider 62 on the potentiometer resistance 58 in response to the rotation of the motor 98.

The relay 32 has an armature 102 mechanically connected to close the normally open contacts of switches 82 and 94 when the actuating coil 30 is energized. The armature 102 is also arranged to close the contacts of a normally open switch 104 when the actuating coil 30 is energized. The switch 104 is connected to control an external circuit, not shown. The relay 46 has an armature 106 suitably mechanically connected to close the normally open switches 86 and 88 upon energization of the actuating coil 44. The armature 106 is also mechanically connected to close a normally open switch 108 whenever the coil 44 is energized. The switch 108 is connected to control an external circuit, not shown. The normally closed switches 34 and 48 are lock-out switches and are connected to armatures 106 and 102 respectively so the switches will be opened whenever the relays 46 and 32 respectively are energized to prevent simultaneous energization of the relays 32 and 46.

Also included in Fig. 1 is a potentiometer resistance 110 which is connected to an external circuit to be controlled and which has a movable slider 112 mechanically connected to slider 62 so that the movement of slider 62 on potentiometer 58 will cause a corresponding movement of slider 112 on potentiometer 110. The normally open switch contacts 104 and 108 and the potentiometer 110 may be included in the same external circuit and if desired, may be used to control the operation of a motor or other similar apparatus as is well known to those skilled in the art.

The switches 36 and 50 are preferably limit switches which are arranged to open the circuits wherein they are included when the slider 62 is moved beyond predetermined limits on the potentiometer 58. With the above parts in mind, the operation of the circuit will now be explained.

It is clearly apparent that whenever winding 12 is energized, the windings 14 and 16 will supply direct current between leads 18 and 22 and leads 24 and 28. When the system is in balance, i.e., when the potentiometers sliders are at a null position, the potentials on bases 66 and 74 will be substantially equal. Should, however, the slider 64 be moved to the left to achieve a control function, the base 74 will become positive relative to the base 66. Current will then flow from lead 22 through the slider 64, the resistance 72, rectifier 76 to junction 78 and through lead 28 where it is conducted by the emitter 38 and base 66 of transistor 42 and through the slider 62 to lead 18. This will cause an increased current flow between the emitter 38 and collector 40 of transistor 42 to energize the coil 30 of relay 32 sufficiently to attract armature 102 and cause the closing of switches 104, 94 and 82 and opening of switch 48. When switches 82 and 94 are closed, current will flow from lead 28 through switch 94, junction 92, the motor 98, the potentiometer resistance 95 and switch 82 to lead 24, thereby causing the motor to rotate in a direction to actuate the mechanical means 100 to move the slider 62 and slider 112 to the left to compensate for the leftward movement of slider 64.

When the slider 64 is moved to the right, the base 74 will become negative relative to base 66. When this occurs, current will flow from the lead 22 through the slider 62, the rectifier 70, junction 68, to lead 28 to cause an increase in conduction of current between the emitter 52 and the base 74 of transistor 56, which current is delivered through the current limiting resistance 72 and the slider 64 to the potentiometer resistance 60 to lead 18. The current flow between the emitter 52 and the base 74 will cause a corresponding, larger, current flow between the emitter 52 and the collector 54, to energize the winding 44 sufficiently to attract armature 106 to effect the closing of switches 108, 86, and 88 and the opening of switch 34. When the switches 86 and 88 are closed, the circuit to the motor 98 is completed from lead 28 through a circuit which includes switch 86, slider 96, junction 92, junction 90, and switch 88 to lead 24. When the motor 98 is energized through this circuit, the mechanical means 100 will move the sliders 62 and 112 to the right to restore the balance between the potentials on the bases 66 and 74 of transistors 42 and 56 respectively. The potentiometer 95 in Fig. 1 is used to adjust the speed response of motor 98 to its energizing circuit.

Figure 2:
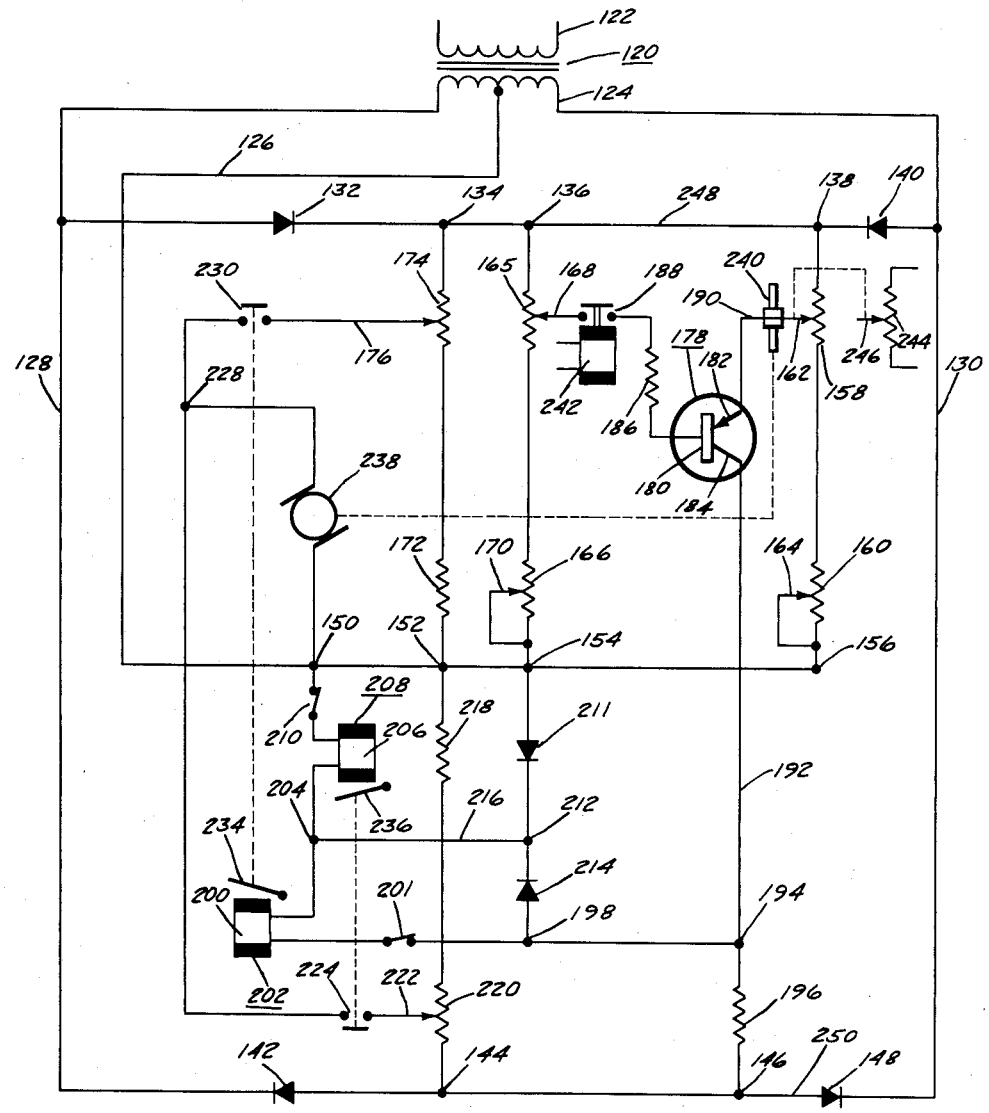
Fig. 2 shows a modified form of the circuit in Fig. 1 wherein a single transistor controls the means for positioning the sliders of the slave potentiometers.

In the embodiment shown in Fig. 2 of the drawings, the transformer 120 has a primary 122 connected to a suitable source, not shown. The transformer 120 has a center tapped secondary winding 124. The center tap of the transformer is connected to a lead 126 while the other terminals are connected to leads 128 and 130. Connected between leads 128 and 130 is a series circuit comprising a rectifier 132, a junction 134, a junction 136, a junction 138 and a rectifier 140. Also connected between leads 128 and 130 is a series circuit comprising a rectifier 142, a junction 144, a junction 146 and a rectifier 148. The lead 126 also includes junctions 150, 152, 154, and 156, as shown. Connected between the junctions 138 and 156 are a pair of series connected potentiometer resistances 158 and 160 having movable sliders 162 and 164 respectively. Connected between the junction 136 and the junction 154 are series connected potentiometer resistances 165 and 166 having movable sliders 168 and 170 respectively. Connected between the junction 134 and junction 152 in series is a fixed resistance 172 and a potentiometer resistance 174 having a movable slider 176. A transistor 178 is shown as having a base 180 and an emitter 182 and a collector 184 with the base 180 connected through a series circuit comprising a current limiting resistance 186, a pair of normally open switch contacts 188 to slider 168. The emitter 182 is connected through a suitable lead 190 to the slider 162 while the collector 184 is connected through a lead 192 to a junction 194 which in turn is connected through a resistance 196 to junction 146. Connected between the junction 194 and the junction 150 is a series circuit comprising a junction 198, a normally closed switch, 201, an actuating coil 200 of a relay 202, a junction 204, an actuating coil 206 of a relay 208 and a normally closed switch 210. Connected between the junction 154 and the junction 198 is a series circuit comprising a rectifying diode 211, a junction 212 and a rectifying diode 214. The junctions 204 and 212 are connected by a lead 216. Connected between junction 152 and 144 is a series circuit comprising a fixed resistance 218 and a potentiometer resistance 220 having an adjustable slider 222 which is connected through a series circuit comprising a normally open switch 224, a junction 228, and a normally open switch 230 to the slider 176. The relay 202 has an armature 234 which is mechanically connected as shown to close switch 230 whenever the coil 200 is energized. The relay 208 has an armature 236 which is mechanically connected to close switch 224 whenever the coil 206 is energized. The terminals of an electric motor 238 are connected to junctions 228 and 150 respectively. The motor is mechanically connected by a suitable means 240 to move the slider 162 on the potentiometer 158 whenever the motor is actuated in either direction of rotation. The switches 210 and 201 are limit switches which will cause a de-energization of relays 208 and 202 whenever the slider 162 is moved beyond a predetermined range of movement. The switch 188 is an initiating switch which may be closed either manually or by suitable means, such as an electromagnet 242 which is connected to be energized from a suitable source, not shown. The circuit also includes a potentiometer resistance 244 which may be included in an external circuit to be controlled and has a movable slider 246 mechanically connected as shown to slider 162. The potentiometer 165 will be termed the "master" potentiometer while the potentiometers 158 and 244 will be termed the "slave" potentiometers. With the above parts in mind, the operation of the circuit will now be described.

The rectifying diodes 132, 140, 142, and 148 are arranged in the circuit so that whenever the transformer 120 is energized, the lead 248 which connects the diodes 132 and 140 will have a positive voltage relative to the lead 126. The rectifying diodes 142 and 148 are arranged in lead 250 to cause lead 250 to be negative relative to lead 126. When the transformer 120 is energized and the switch 188 is closed, the circuit will be energized at the "at rest" position and the remaining switches will be in the position shown. When the slider 168 is moved upwardly on the potentiometer resistance 165, the base 180 of the transistor 178 will be biased positive relative to the emitter 182 which is connected to the slider 162 of the slave potentiometer 158. The positive bias on base 180 will cause a decrease in current flow between the emitter 182 and the collector 184. This will cause a corresponding increased voltage drop across emitter 182 and collector 184, and cause the junction 194 to be increasingly negative with respect to junction 154. When the junction 194 is more negative, current will flow from the center tap of transformer secondary 124 through lead 126 including junctions 150, 152, 154, and rectifier 211 to junction 212 and through lead 216 to junction 204 and through the actuating coil 200 and switch 201 and junction 198 to junction 194. This current flow through the actuating coil 200 will attract the armature 234 and close switch 230 to complete the motor circuit from junction 134 through potentiometer 174 and slider 176, switch 230, junction 228 and motor 238 to junction 150. The motor is mechanically connected by means 240 to move the sliders 162 and 246 upwardly on the slave potentiometers 158 and 244 respectively to restore the electrical balance in the system.

When the slider 168 is moved downwardly on the potentiometer resistance 165, the base 180 of the transistor 178 will be biased negative relative to the emitter 182 which is connected to the slider 162 of the slave potentiometer 158. This negative bias on the base 180 will cause an increase in current flow between the emitter 182 and the collector 184 to increase the voltage drop across the resistance 196 to cause the junction 194 to become more positive. This in turn will cause current flow to occur from the junction 194 to lead 126 through a circuit which includes junction 198, rectifier 214, junction 212, lead 216 and junction 204 through the relay coil 206 and switch 210 to junction 150 where the current is returned to the lead 126 to the center tap of the transformer. The current flow through the relay coil 206 will cause armature 236 to be attracted thereby closing switch 224 and completing a circuit from the junction 150 through the motor 238 and junction 228 through the switch 224 to the slider 222 to junction 144. When the motor is energized by current flow through this circuit, it will rotate the mechanical means 240 to move the sliders 162 and 158 downwardly so as to restore the balance in the system.

All of the diodes are shown in the system to conduct current in accordance with standard practices. The potentiometer resistances 174 and 220 including resistors 172 and 218 are used to control the speed response of the motor to the enerigzation of the circuit heretofore described. The potentiometers 166 and 164 are used to adjust the basic settings of potentiometers 165 and 158. The switches 201 and 210 are limit switches which will de-energize the circuits connected therewith when the slider 162 exceeds its range of movement on the potentiometer resistance 158.

From the above it is apparent that the present invention is directed to a transistorized control which will cause a motor driven slave potentiometer to be adjusted in response to the adjustments of the master potentiometer. In this connection it is apparent that while only two slave potentiometers are shown, other potentiometers may be mechanically coupled to the slave potentiometer if desired.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control system, the combination comprising; a pair of potentiometers each having an adjustable element, a voltage source connected across the potentiometers, a single transistor having a base electrode connected to the adjustable element of one of said potentiometers and an emitter electrode connected to the adjustable element of the other potentiometer whereby the conduction of the transistor means is dependent upon the voltage differences between the adjustable elements and means responsive to the conduction of the transistor means for adjusting one of the two potentiometers whenever the other potentiometer is manually adjusted.

2. In a control system, the combination comprising; a master potentiometer and a slave potentiometer each of said potentiometers having an adjustable slider, a voltage source across the master and the slave potentiometers, a single transistor having an emitter and base electrodes respectively connected to the sliders to be responsive to the potential differences of the sliders of both of the potentiometers whereby the conduction of the transistor means is responsive to changes in adjustment of the master potentiometer and means responsive to the conduction of the transistor means for adjusting the slave potentiometer in accordance with the adjustment of the master potentiometer.

3. In a control system, the combination comprising; a master and a slave potentiometer, a source of current and voltage connected across the master and the slave potentiometer, a single transistor having an emitter connected to said source through the slave potentiometer and a base connected to the source through the master potentiometer whereby the conduction of the transistor is dependent upon the setting of both potentiometers, and means electrically connected to the transistor and responsive to the conduction thereof and mechanically connected to the slave potentiometer for varying the adjustment of the slave potentiometer in response to manual adjustments of the master potentiometer.

4. In a control system, the combination comprising; a regulating element providing a source of variable voltage, a regulated element providing a source of variable voltage, a single transistor having a control electrode connected to the regulating element and a principal electrode connected to the regulated element whereby the conduction of the transistor means is dependent upon the voltages of the regulating and regulated elements and means including a pair of relays responsive to the conduction of the transistor for adjusting the regulated element in response to adjustments of the regulating element.

5. The combination as recited in claim 1 wherein the means responsive to the conduction of the transistor means includes a pair of relays each connected in a circuit with the transistor.

6. The combination as recited in claim 1 wherein the means responsive to the conduction of the transistor includes a resistance in circuit with the transistor and a pair of relay actuating coils which are selectively energized in response to the variations in voltage across the resistor caused by variations in conduction of the transistor.

7. The combination as recited in claim 6 wherein the resistance is in series circuit with both of the actuating coils and the direction of current flow through said resistance determines which of the coils is energized.

References Cited in the file of this patent

UNITED STATES PATENTS

| 2,498,654 | Deakin | Feb. 28, 1950 |
| 2,684,459 | Brown et al. | July 20, 1954 |
| 2,703,379 | Malick | Mar. 1, 1955 |
| 2,846,630 | Boyle et al. | Aug. 5, 1958 |
| 2,914,717 | Redding | Nov. 24, 1959 |